July 11, 1933.  H. A. WIBERG  1,917,679

CIRCUIT ARRANGEMENT FOR THE REGISTRATION OF ELECTRIC IMPULSES

Filed Sept. 24, 1929

H. A. Wiberg, INVENTOR

By Marks & Clerk, Att'ys.

Patented July 11, 1933

1,917,679

UNITED STATES PATENT OFFICE

HELGE ALLAN WIBERG, OF FALUN, SWEDEN, ASSIGNOR TO TELEFONAKTIEBOLAGET L. M. ERICSSON, OF STOCKHOLM, SWEDEN, A COMPANY OF SWEDEN

CIRCUIT ARRANGEMENT FOR THE REGISTRATION OF ELECTRIC IMPULSES

Application filed September 24, 1929, Serial No. 394,913, and in Sweden October 4, 1928.

The present invention relates to circuit arrangements in which impulses sent out from mutually independent devices have to perform similar operations in a common device of any kind; said operations, by way of example, consisting in the registration or the summing-up of impulses sent out from a number of impulse sending devices. It might then occur that the mutually independent impulses are sent out at such moments that they entirely or partially cover or coincide with one another in which case they might be undesirably registered as a single impulse. The problem, then, is to separate the entirely or partially coinciding impulses in such a manner that they are received successively in the registering device and perform their functions without disturbing each other. As a practical example a metering system may be mentioned in which a number of electric meters are equipped with contact devices whereby an impulse is sent out, for instance, for each measured kilowatt hour, said impulses being registered by a common counter to indicate the sum of the impulses sent out within a certain period of time or in other words the number of all the kilowatt hours measured by all the meters.

In hitherto known arrangements for said purpose, planet wheel gears or rotating contact devices or the like have been used of a more or less complicated nature which render the registration device expensive and also easily cause faulty registrations.

The object of the present invention is to bring about a simple and, at the same time, reliable device of this kind. The invention consists in the combination of a number of relays forming an impulse repeating device interconnected between the impulse sending devices and the common registering device in such a manner that when several relays are simultaneously actuated by the impulse sending devices only one relay lets through impulses to the registering device whereas the other relays are held ready thereafter to forward impulses in turn to the registering device in that order of sequence which corresponds to their position in relation to the first impulse forwarding relay.

Figure 1:
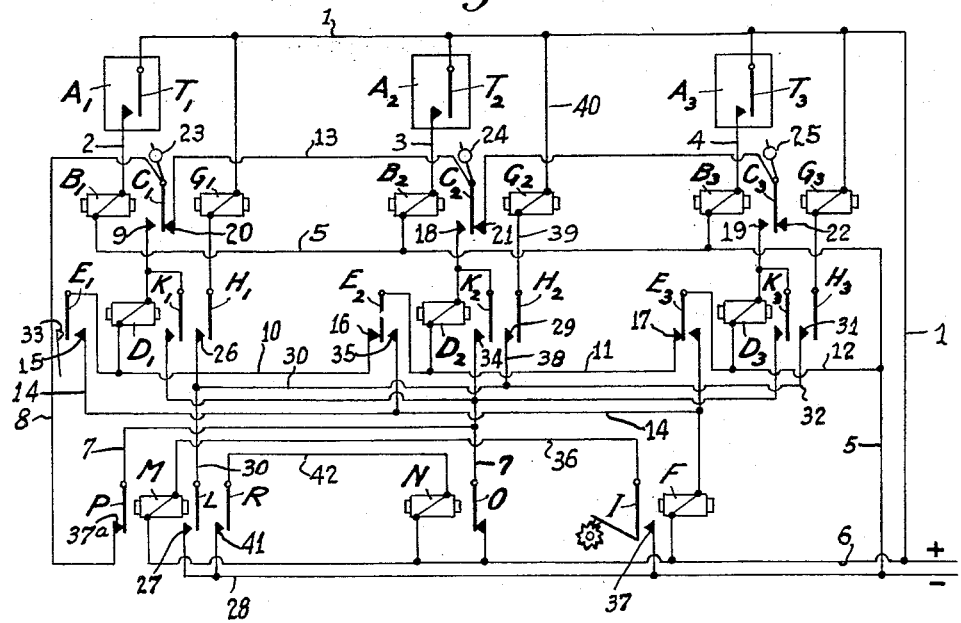
Figure 2:
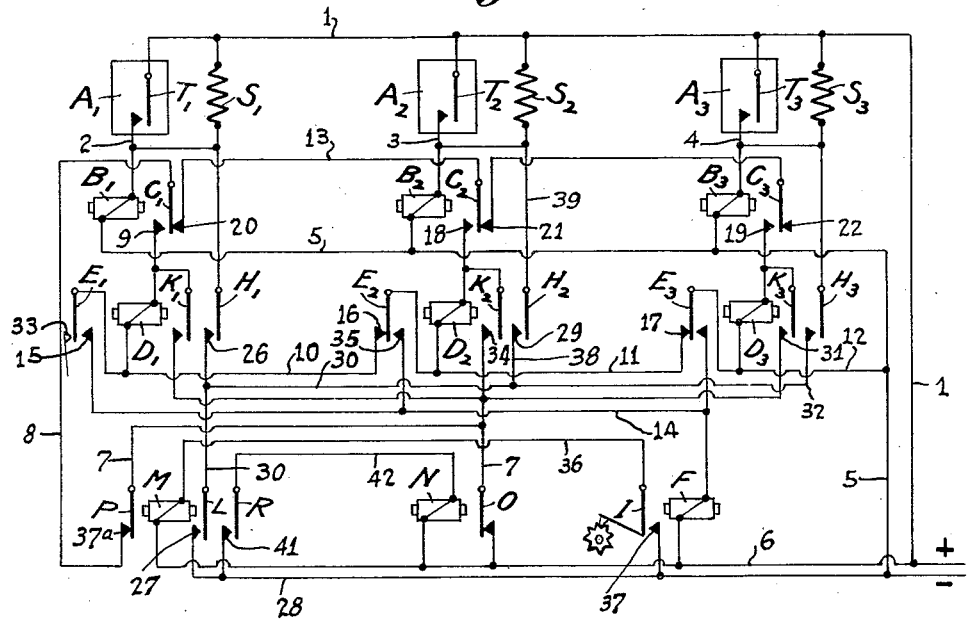

On the accompanying drawing Figures 1 and 2 show circuit diagrams of different embodiments of a circuit arrangement according to the invention.

In Figures 1, $A_1$, $A_2$, $A_3$ indicate a number of electric meters each of which is adapted to close a contact $T_1$, $T_2$, $T_3$ respectively, by way of example, for each kilowatt-hour measured. Through the closed contact current is supplied from the plus-pole of the battery over the conductor 1, anyone of the above mentioned contacts and through conductors 2 or 3 or 4 to a primary impulse separating relay $B_1$, $B_2$, $B_3$ respectively, whereupon the circuit is completed over the wire 5 to the negative pole of the battery. Said relays are adapted to close contacts $C_1$, $C_2$, $C_3$ respectively, whereby current is supplied through secondary impulse separating relays $D_1$, $D_2$, $D_3$ respectively over a circuit which, for instance, for relay $D_1$ is traced as follows: From the plus-pole of the battery over the conductor 6, the contact O of a relay N, conductor 7, contact P of the relay M, conductor 8, contact $C_1$ of relay $B_1$, front contact 9 of the same relay, winding of relay $D_1$, conductor 10, back contact and contact $E_2$ of relay $D_2$, conductor 11, back contact and contact $E_3$ of relay $D_3$, conductor 12, conductor 5 and negative pole of the battery. If the relay $D_2$ is to be actuated, the conductor 8 by means of contact $C_1$ and back contact 20 of relay $B_1$ is connected to the wire 13 and a circuit is then completed over the contact $C_2$ of the relay $B_2$ and front contact 18 of the relay $B_2$ through the winding of the relay $D_2$ to the wire 11. A circuit may be closed in a similar manner through the relay $D_3$. The relays $D_1$, $D_2$, $D_3$ close in turn contacts $E_1$, $E_2$, $E_3$ respectively, whereby current is supplied to a common registering device or counter F over a circuit which in the case the relay $D_1$ should be actuated, is traced as follows: The plus-pole of the battery, conductor 6, winding of the counter F, conductor 14, front contact 15 of the relay $D_1$, contact $E_1$, wire 10, back contact 16 and contact $E_2$ of the relay $D_2$, wire 11, back contact 17 and contact $E_3$ of the relay $D_3$, wire 12, conductor 5 and the negative pole of the battery. Similar circuits are closed upon actuation of the relays $D_2$ and $D_3$ through the counter F. The counter F will thus register one unit for each impulse sent from the meters $A_1$, $A_2$, $A_3$ respectively.

As will be seen from the drawing the operating circuits of the secondary relays are carried over front contacts 9, 18, and 19 respectively of the primary relays as well as over the contacts $C_1$, $C_2$, $C_3$ of the same relays, the said contacts being connected in series so that if several primary relays are operated simultaneously, only the secondary relays at the extreme left hand side obtains current. The armatures of the primary relays are arranged so as to have two positions one position when the contacts $C_1$, $C_2$, $C_3$ respectively of the same lean against the back contacts 20, 21, 22 respectively. This may be obtained by providing the armatures with weights 23, 24, 25 respectively just above the pivot axis. The armatures $C_1$, $C_2$, $C_3$ thus may be kept in locked position until they are unlocked by separate relays $G_1$, $G_2$, $G_3$ which are arranged via contacts $H_1$, $H_2$, $H_3$ of the secondary relays over circuits which are traced as follows: For the relay $G_1$ from the plus-pole of the battery over conductor 1 through winding of the relay $G_1$, contact $H_1$ and front contact 26 of the relay $D_1$, contact L and front contact 27 of relay M, conductor 28 and minus-pole of the battery. For the relay $G_2$, plus-pole of the battery, conductor 1, winding of the relay $G_2$, contact $H_2$ and front contact 29 of the relay $D_2$, conductor 30, contact L and front contact 27 of relay M, conductor 28 and minus-pole of the battery. For relay $G_3$ plus-pole of the battery, conductor 1, winding of relay $G_3$, contact $H_3$ and front contact 31 of relay $D_3$, conductors 32 and 30, contact L and front contact 27 of the relay M, conductor 28, minus-pole of the battery.

The circuits of the secondary relays are also controlled by series connected contacts $E_1$, $E_2$, $E_3$ respectively, which lean against back contacts 33, 16 and 17, in such a manner that each secondary relay upon operating will interrupt the circuit of all secondary relays which are disposed further to the left.

If, by way of example, the meters $A_2$, $A_3$ should send impulses simultaneously to the relays $B_2$ and $B_3$ respectively, the operation will proceeed as follows: The armatures $C_2$ and $C_3$ are both attracted respectively but only the relay $D_2$ is energized as the circuit over the contact $C_2$ to the relay $D_3$ is interrupted at the contact $C_2$.

The relay $D_2$ connects itself into a holding circuit traced from the plus-pole of the battery, conductor 6, contact O of the relay N, front contact 34 and contact $K_2$ of the relay $D_2$, relay $D_2$, conductor 11, front contact 17 and contact $E_3$ of the relay $D_3$, conductor 12, conductor 5 and minus-pole of the battery. Moreover the counter F obtains current over a circuit running from the plus-pole of the battery, conductor 6, counter F, conductor 14, front contact 35 and contact $E_2$ of the relay $D_2$, conductor 11, back contact 17 and contact $E_3$ of the relay $D_3$, conductor 12, conductor 5 and minus-pole of the battery. At the same time the current path over the conductor 10 to the relay $D_1$ is interrupted at the contact $E_2$ of the secondary relay $D_2$ in such a manner as to make the said relay $D_1$ inoperative in case the meter $A_1$ in this moment should actuate the relay $B_1$. In the case last mentioned or if the meter $A_1$ would send impulses simultaneously with the meter $A_2$ the operating circuit of the relay $D_2$ already traced would be opened by the armature $C_1$. It is for avoiding such an inconvenience that the relay $D_2$ is provided with the holding contact $K_2$.

When the counter F has thus obtained current over the contact $E_2$ of the relay $D_2$ and has been advanced another step a contact I of the counter is closed, whereby a relay N is connected into circuit. The said circuit runs as follows: Plus-pole of the battery, conductor 6, winding of the relay M, conductor 36, contact I, front contact 37 of the counter F, conductor 28 and the minus-pole of the battery. The relay M is provided with a contact P which normally leans against the back contact 37a and two contacts L and R which are normally opened. When the relay M is energized the contact L is brought close to the front contact 27, a circuit is closed for the moment from the minus-pole of the battery over contacts 27 and L of the relay M, conductor 30, conductor 38, front contact 29 and contact $H_2$ of the relay $D_2$, conductor 39, winding of the relay $G_2$, conductor 40, conductor 1 and plus-pole of the battery. Thereby the relay $G_2$ is brought to throw over the contact $C_2$. At the same time the circuit over the armature $C_2$ is opened at the contacts 37a and P of the relay M. Further the relay M upon operating connects up the relay N at its contacts R and 41 over a circuit running as follows: Plus-pole of the battery, conductor 6, winding of the relay N, conductor 42, contact R and front contact 41 of the relay M, conductor 28, minus-pole of the battery. The relay N opens at its contacts O and 42, the holding circuit already traced of the relay $D_2$ which releases its armature and causes the deenergization of the counter relay F and the control relays M and N. If, as above assumed, the primary relay $B_1$ has been energized in the meantime, a circuit will now be closed through the relay $D_1$ over the contact P and the armature $C_1$, in its locked position. The above described operation is then repeated in such a manner as to cause the counter F to be advanced another step. After the armature $C_1$ has been restored to its normal position and the relays M and N have been deenergized, the relay $D_3$ will be operated in a similar way to register the impulse from the meter $A_3$.

Fig. 2 shows a simplified circuit diagram using electrically self-locking primary relays. The relays $G_1$, $G_2$, $G_3$ in Figure 1 are thus replaced by resistances $S_1$, $S_2$, $S_3$ included in the continously closed circuits of the primary relays and arranged to be short-circuited by the impulse contacts $T_1$, $T_2$, $T_3$ respectively. Said resistances are so designed that the current normally flowing through the primary relays is insufficient to operate said relays. Upon the closure of a contact $T_1$, $T_2$, $T_3$ the current through the corresponding primary relay will be strengthened to such an extent as to cause the relay to attract its armature. A primary relay $B_1$, $B_2$, $B_3$, upon being thus energized, will cause the same operation as above described with the exception only that the unlocking of the armatures of the primary relays is effected by a complete deenergization of said relays. For this purpose the primary relays are arranged to be short-circuited over the contacts $H_1$, $H_2$, $H_3$ respectively of the secondary relays such short-circuit being closed at the contact L upon the relay M attracting its armature. After said short-circuit has been opened, the armature of the primary relay will remain in its normal retracted position as the current now flowing through the primary relay and the appertaining resistance $S_1$, $S_2$, $S_3$ respectively is insufficient to cause the relay to attract its armature.

I claim:—

1. In an impulse registering system the combination of a number of impulse senders, an impulse registering device to be operated by impulses from said impulse senders, an impulse separator interconnected between said impulse senders and impulse registering device and comprising a primary impulse separating relay of the self-locking type for each impulse sender means for energizing said relay by the impulses sent from the impulse sender, a secondary impulse separating relay for each impulse sender, the circuits of the secondary relays being controlled by the primary relays so as to prevent more than one secondary relay to be operated at a time and to prepare the circuit of another secondary relay upon a primary relay being unlocked, means under the control of said secondary relays for unlocking said primary relays in succession, and means for sending an unlocking impulse for each operation of the registering device.

2. In an impulse registering system the combination of a number of impulse senders, impulse circuits for said senders, self-locking primary impulse separating relays in said circuits, secondary impulse separating relays, operating circuits for said secondary relays controlled by said primary relays so as to prevent more than one secondary relay to be operated at a time and to prepare the circuit of another secondary relay upon a primary relay being unlocked, an impulse registering device, means for unlocking said primary relays, circuits for said unlocking means under the control of the appertaining secondary relays, and means for sending an unlocking impulse for each operation of the registering device.

3. An impulse registering system as claimed in claim 2, in which the circuits of the secondary separating relays are carried over series connected back contacts on the primary separating relays as well as over series connected back contacts on the secondary relays.

4. In an impulse registering system the combination of a number of impulse senders, impulse circuits for said senders, self-locking primary impulse separating relays in said circuits, secondary impulse separating relays, operating circuits for said secondary relays controlled by said primary relays so as to prevent more than one secondary relay to be operated at a time and to prepare the circuit of another secondary relay upon a primary relay being unlocked, an impulse registering device, a short-circuit for each of said primary relays arranged under the control of the appertaining secondary relay and means under the control of the impulse registering device for unlocking said primary relays by closing such short-circuit for each operation of the registering device.

5. An impulse registering system as claimed in claim 2, in which the secondary separating relays are associated with holding circuits and switching means under the control of the impulse registering device for opening said holding circuits upon each operation of the registering device.

In testimony whereof I affix my signature.

HELGE ALLAN WIBERG.